United States Patent Office 3,708,325
Patented Jan. 2, 1973

3,708,325
PROCESS FOR METAL COATING BORON
NITRIDE OBJECTS
Robert G. Kurtz, Arvada, and Theodore Van Vorous,
Boulder, Colo., assignors to The Dow Chemical Company, Midland, Mich.
No Drawing. Filed Apr. 14, 1970, Ser. No. 28,519
Int. Cl. C23c 11/00, 13/00, 13/02
U.S. Cl. 117—61                                    6 Claims

ABSTRACT OF THE DISCLOSURE

Disclosed is a process for metal coating boron nitride objects containing less than 0.1 percent boric oxide. The process involves vacuum degassing at a temperature of from 200° to 250° C. at a pressure no greater than about $4.0 \times 10^{-6}$ torr and heating the boron nitride object to a temperature of at least about 200° C. under an inert gas pressure no greater than about $2.5 \times 10^{-2}$ torr. While maintaining the reduced pressure and elevated temperature, beryllium is ion plated upon the object to form a boron nitride-beryllium composite. The metal coating is then deposited upon the boron nitride-beryllium composite by conventional means to form a boron nitride/beryllium/metal matrix.

---

The invention described herein was made in the course of, or under, a contract with the United States Atomic Energy Commission.

It has been suggested that boron nitride objects such as fibers in composite with various metals be used in applications such as heat and electrical insulators, ablation shields and protective clothing. Additionally, metal coated boron nitride discs have been found to be useful as X-ray calorimeters. However, such utility is limited by the difficulty in forming boron nitride-metal composites. Direct deposition of most metals upon a boron nitrate substrate does not produce a suitable composite. Good adherence between the metal and boron nitride is not obtainable due to the inability of the metal to wet the substrate.

U.S. Pat. 3,344,505 discloses a method for bonding certain refractory metals to boron nitride which involves placing a strip of aluminum between the boron nitride object to be coated and the refractory metal and heating the combination to at least 1200° C.

It is an object of the present invention to provide a novel method for metal coating boron nitride objects.

An additional object is to provide such a process which will cause the formation of a boron nitride/beryllium/metal matrix at temperatures below the melting point of the coating metal.

The process of the present invention involves ion plating a beryllium film upon a boron nitride object to form a boron nitride-beryllium composite. The coating metal is then deposited upon the composite by conventional means to form a boron nitride/beryllium/metal matrix.

Prior to ion depositing the beryllium film, the boron nitride object should be heated and degassed to insure good adherence. This is accomplished by heating the object to a temperature of from 200° to 250° C. at a pressure of no greater than about $4.0 \times 10^{-6}$ torr for a time sufficient to dry and degas the object.

It has been discovered that boron nitride containing significant amounts of boric oxide cannot be effectively coated with beryllium due to moisture pickup. Consequently it is necessary to use a boron nitride substrate containing less than 0.1 percent boric oxide. Additionally, the substrate should be carefully cleaned before deposition to assure good adherence between the boron nitride and beryllium.

After cleaning and degassing the boron nitride object it is beryllium coated by accelerated ion deposition. The ion deposition is carried out under an inert gas pressure of no greater than about $2.5 \times 10^{-2}$ torr. Among the inert gases, argon is preferred. By following the procedure described herein, an adherent interface is formed between the boron nitride and beryllium layer. The thickness of the beryllium film is not critical. A thickness of from 250 to 500 A. is readily deposited by the ion deposition method. After deposition of the beryllium film to form the boron nitride-beryllium composite, the metal coating is applied by conventional means. Any metal which will wet the beryllium film may be deposited on the boron nitride-beryllium composite to form the boron nitride/beryllium/metal matrix.

Vacuum deposition methods, i.e. accelerated ion, triode sputtering or electron beam gun deposition, are used to apply the metal when a thin coating is desired. Coatings of from 0.1 to 0.5 mil are readily applied by these techniques. Accelerated ion deposition is preferred for coating with metals which can be readily evaporated such as lanthanum, gold, aluminum, silver and copper. For metals such as molybdenum, cerium and titanium, triode-sputtering techniques or electron beam gun deposition is preferred. When the latter two methods for metal deposition are used, the coated boron nitride object is allowed to cool and cleaned by argon ion bombardment for approximately two minutes at 2 kv. and approximately 0.1 to 0.3 milliampere per square centimeter of total cathode area. Care must be taken during the sputtering and electron-beam film deposition processes to keep the substrate from reaching a higher temperature than that developed during the beryllium deposition.

Attempts at depositing a metal film directly onto the boron nitride have resulted in a nonadherent coating. This was true whether the film was ion plated or thermally evaporated, except in the case of beryllium which produced an adherent film when ion-plated.

Methods other than vacuum deposition can be used to deposit the metal layer. The catalytic deposition of aluminum described in U.S. Pat. 3,462,288 may be employed to deposit a layer of aluminum on the boron nitride-beryllium composite. When a relatively thick coating is desired or not deemed detrimental to the use contemplated for the matrix, the boron nitride-beryllium composite can be dipped in the melt of the metal, provided the metal has a melting point lower than that of beryllium.

EXAMPLE I

A boron nitride disc containing less than 0.1 percent boric oxide was prepared for coating by lightly abrading the surface with 600 grit abrasive paper. Residues of the abraded boron nitride and the abrasive paper were removed by air pressure at about 15 p.s.i. The clean boron nitride disc was placed in a vacuum oven where the pressure was reduced to $2.0 \times 10^{-2}$ torr and the temperature raised to 225° C. for degassing and drying. After 24 hours in the vacuum oven the disc was removed and placed in a substrate holder previously mounted in the work chamber of a vacuum system. The work chamber contained 2 resistively heated evaporation boats, one made of tungsten and the other of tantalum, mounted approximately 5 inches below the substrate holder. The tungsten boat contained about 1 gram of gold and the tantalum boat about 20 mg. of beryllium. Electrical connection was made to the beryllium source and boron nitride disc by means of a vacuum electrical feed-thrus capable of passing 3 kv. and up to 500 amperes. The boron nitride served as the cathode and the beryllium as anode so that upon application of power from a high voltage supply an electrical potential developed.

The work chamber was closed and evacuated to less than about $4 \times 10^{-6}$ torr. The tantalum evaporation boat was resistively heated to a temperature just below the melting point of the beryllium metal to heat the boron nitride to a temperature of about 200° C. and maintained for ½ hour to complete the outgassing and heating of the boron nitride. The vacuum system was throttled and argon gas admitted to obtain a dynamic system of $2.5 \times 10^{-2}$ torr pressure argon. The high voltage power supply was turned on and set at 3 kv. while the temperature of the tantalum evaporation boat was increased to evaporate the beryllium metal. After completion of the beryllium metal evaporation, the power supply was turned off and external connection made to the tungsten evaporation boat which was then heated to a temperature sufficient to start evaporation of the gold. After about 10% of the gold had been evaporated, the vacuum system was unthrottled and evaporation of the gold continued to completion.

Examination of the boron nitride disc disclosed a boron nitride/beryllium/gold matrix having good adherence between the interfaces.

EXAMPLE II

A boron nitride disc was prepared and beryllium coated as in Example I. After cooling for approximately 1 hour the disc was removed from the vacuum work chamber and placed in a second chamber containing an electron beam gun, the hearth of which contained titanium metal. The chamber was evacuated to about $4 \times 10^{-6}$ torr and the electron beam gun operated to cause evaporation of the titanium metal and its subsequent deposition over the boron nitride-beryllium composite to form an adherent boron nitride/beryllium/titanium matrix.

EXAMPLE III

A boron nitride disc was prepared and beryllium coated as in Example I. After the beryllium coating the disc was allowed to cool at room temperature for approximately 1 hour and moved from its vacuum work chamber to a second vacuum work chamber containing apparatus for triode sputtering. The target (cathode) in the second work chamber was a molybdenum disc ¼" thick x approximately 2" in diameter. The second work chamber was closed and evacuated to below about $4 \times 10^{-6}$ torr and the molybdenum metal caused to deposit on the boron nitride-beryllium substrate by means of triode sputtering techniques.

We claim:
1. A process for metal coating boron nitride objects containing less than 0.1 percent boric oxide which comprises:
 (a) heating the boron nitride object to a temperature of from 200° to 250° C. at a pressure of no greater than about $4.0 \times 10^{-6}$ torr;
 (b) ion plating a film of beryllium upon the objects, at a temperature of at least about 200° C. under an inert gas pressure of no greater than about $2.5 \times 10^{-2}$ torr to form a boron nitride-beryllium composite, and
 (c) depositing a layer of a beryllium wetting metal over the boron nitride-beryllium composite to form a boron nitride/beryllium/metal matrix.
2. The process of claim 1 wherein the beryllium is deposited to a thickness of from 250 to 500 A.
3. The process of claim 1 wherein the metal is deposited by a vacuum deposition method.
4. The process of claim 3 wherein the metal is lanthanum, gold, aluminum, silver or copper and the vacuum deposition method is accelerated ion deposition.
5. The process of claim 3 wherein the metal is molybdenum, cerium, or titanium and the vacuum deposition method is triode-sputtering.
6. The process of claim 3 wherein the metal is deposited to a thickness of from 0.1 to 0.5 ml.

References Cited

UNITED STATES PATENTS

| | | | |
|---|---|---|---|
| 3,216,710 | 11/1965 | Lenihan, Jr. et al. | 117—221 X |
| 3,255,522 | 6/1966 | Bull et al. | 117—221 X |
| 3,344,505 | 10/1967 | Rively et al. | 29—195 A X |
| 3,399,076 | 8/1968 | Ginsberg et al. | 117—221 X |
| 3,450,558 | 6/1969 | Whaley et al. | 117—107.2 R |
| 3,515,574 | 6/1970 | Montgomery | 117—71 R |
| 3,543,386 | 12/1970 | Inoue et al. | 117—107.2 R X |
| 3,564,565 | 2/1971 | Haberecht et al. | 117—107 X |

ALFRED L. LEAVITT, Primary Examiner

K. P. GLYNN, Assistant Examiner

U.S. Cl. X.R.

29—195 A, 197, 198, 199; 117—71 R, 107, 107.2 R, 221, 227